(12) United States Patent
Yang

(10) Patent No.: US 8,125,460 B2
(45) Date of Patent: Feb. 28, 2012

(54) METHOD FOR MANUFACTURING TOUCH PANEL WITH GLASS PANEL LAYER AND GLASS SUBSTRATE

(75) Inventor: Kai-Ti Yang, Taipei (TW)

(73) Assignee: Young Fast Optoelectronics Co., Ltd., Kuan Yin, Taoyuan (TW)

( * ) Notice: Subject to any disclaimer, the term of this patent is extended or adjusted under 35 U.S.C. 154(b) by 889 days.

(21) Appl. No.: 12/136,073

(22) Filed: Jun. 10, 2008

(65) Prior Publication Data

US 2009/0303191 A1 Dec. 10, 2009

(51) Int. Cl.
  *G06F 3/041* (2006.01)
(52) U.S. Cl. ....................................................... 345/173
(58) Field of Classification Search .................. 345/176, 345/173

See application file for complete search history.

(56) References Cited

U.S. PATENT DOCUMENTS

| | | | |
|---|---|---|---|
| 2002/0030769 A1* | 3/2002 | Bae ................................. | 349/43 |
| 2003/0057183 A1* | 3/2003 | Cho et al. ........................ | 216/23 |
| 2004/0263771 A1* | 12/2004 | Jeong et al. ................... | 349/187 |
| 2008/0042996 A1* | 2/2008 | Endo et al. .................... | 345/176 |

* cited by examiner

*Primary Examiner* — Quan-Zhen Wang
*Assistant Examiner* — Tony Davis

(57) ABSTRACT

A method for manufacturing a touch panel includes following steps. A substrate is used and an upper surface thereof is formed with a plurality of lower electrode units. A periphery of each lower electrode unit is formed with a gluing frame, and a periphery of the substrate is formed with a sealing frame. A panel layer is used and a lower surface thereof is formed with a plurality of upper electrode units. By the gluing frame and the sealing frame, the substrate and the panel layer are combined together as a combined plate. The combined plate is etched by solution of hydrofluoric acid. One or more than one function film is attached to a surface above each electrode unit. A cutter is used for cutting the panel layer from an upper side thereof and to form a trench, and the substrate is pressed along the trench of the substrate for separating the substrate into a plurality of independent touch panels along the predetermined cutting line.

9 Claims, 3 Drawing Sheets

METHOD FOR MANUFACTURING TOUCH PANEL WITH GLASS PANEL LAYER AND GLASS SUBSTRATE

FIELD OF THE PRESENT INVENTION

The present invention relates to a method of manufacturing a touch panel, and particular to a method for manufacturing a touch panel with a glass panel layer and a glass substrate. The method can produce multiple touch panels in one manufacturing cycle.

DESCRIPTION OF THE PRIOR ART

Touch panel is an input device which is often to be arranged to a screen of a Liquid Crystal Display (LCD) or a CRT. A user can press on the panel through a finger tip or a tip of a pen based on the instruction of the display showing through the touch panel so as to access the input of the position. A general structure of a touch panel, such as a resistive touch panel, is formed by two plates of resistive film attached oppositely with a certain gap between. Usually an upper resistive film is arranged on a surface of a panel layer made of a flexible clear film or a thin glass. A lower resistive film is arranged on a surface of a glass substrate. Through the gluing on a periphery of the opposite side of the panel layer, the two plates are attached together tightly as a touch panel. As known in recent years, through the improvement of performance and manufacturing quality and the deduction of the price, touch panel is extensively applied to various electronics. However, in some special application such as a touch panel equipped to a mobile GPS device, the touch panel will be usually exposed to sunlight and it must have the high temperature resistance ability. In such circumstance, a common plastic film is not appropriate for a material of a panel layer, and a heat-proof glass without light polarization will be a better choice. When a glass is used for a panel layer, the thickness should be very small to form a touch sensing ability which is usually thinner than 0.25 mm. Also, with a brittle characteristic of the glass and the low intensity, it can be only used for manufacturing a small area touch panel which is not bigger than 120 mm to 150 mm in length or width. Moreover, the thin glass is easy to break during a cutting process. It is also hard to maintain the flatness during the combination process of the thin plasses, an optical interference is happened such as a Newton Ring. Besides, the stress remained between the plates will reduce the intensity and the durability of the thin glasses. The manufacturing processes of the touch panel equipped to an automobile have a lot of difficulties to overcome as described above.

SUMMARY OF THE PRESENT INVENTION

Accordingly, a primary object of the present invention is to provide a method for manufacturing a touch panel, and particular to a method of manufacturing a touch panel with a glass panel layer and a glass substrate and capable of producing multiple touch panels in one manufacturing cycle so as to improve production efficiency and also save time and labor power. Also, a greater area touch panel with thin glasses can be manufactured without twisting and breaking the glass during the processes so as to raise the quality and the yield of the touch panel product.

The thickness of the panel layer is about 0.15 mm to 0.25 mm, and the etching thickness is about 0.1 mm to 0.3 mm. Moreover, the gluing frame and sealing frame can be arranged to the substrate and to the panel layer, or to both of them. While the sealing frame can make of a petroleum wax, a light curable gluing, or a heat curable gluing. The constancy of the solution of the hydrofluoric acid is 10% to 30%.

Moreover, at least one function film is attached to the panel layer above the positions of each electrode unit after the process of etching and before the process of cutting, the function films are any or the combination of at least two of a polarizing film, filter, and border icon.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

The features of the present invention will be further described in an embodiment of manufacturing a resistive touch panel with a glass panel layer with 0.2 mm thickness and a glass substrate with 0.5 mm thickness.

Figure 1:
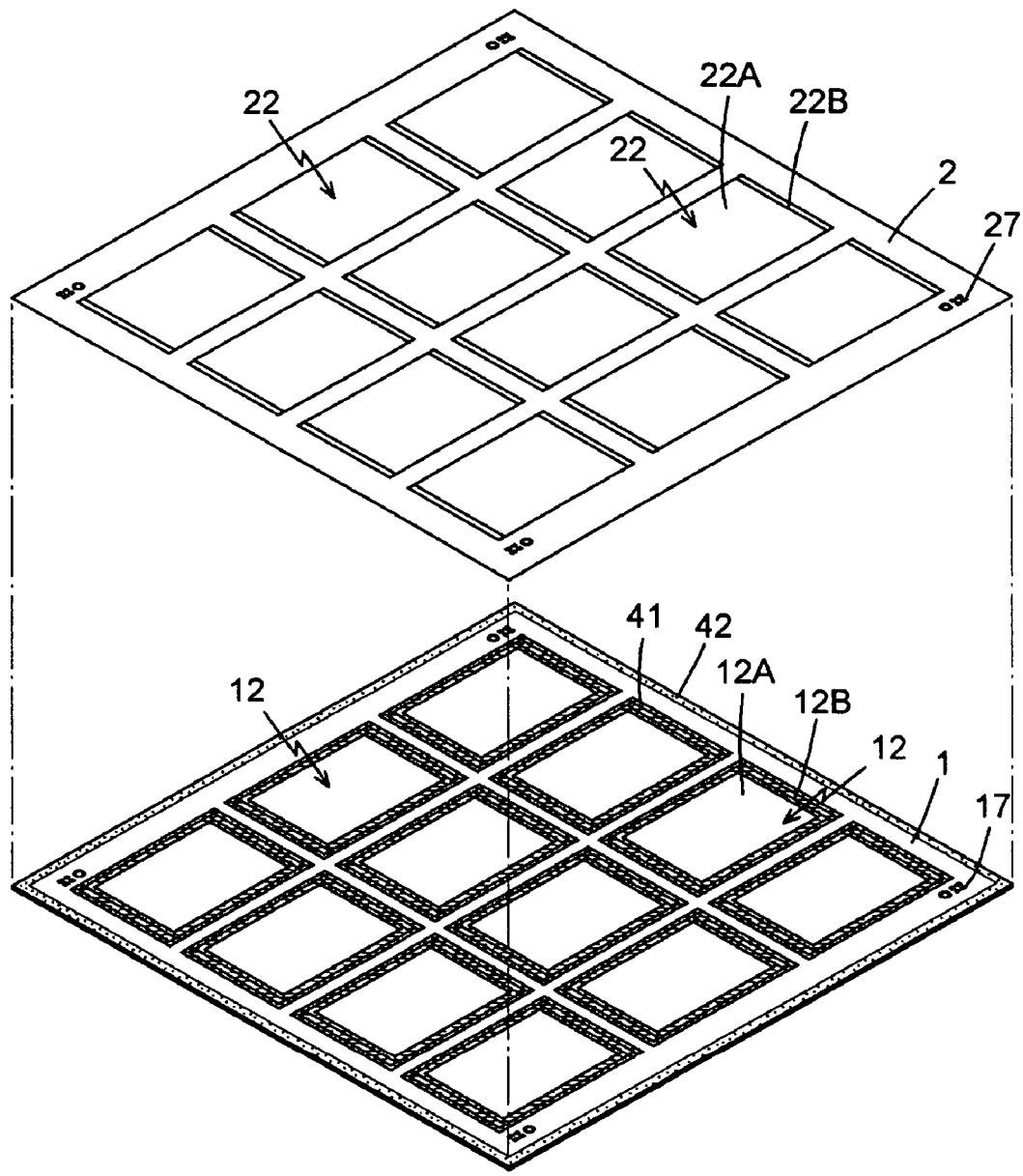
FIG. 1 is a prospective view of disassembly of the panel layer and the substrate of the present invention.

As shown in FIG. 1, a big area glass with 0.7 mm thickness is selected as a substrate 1. And an upper surface of the substrate 1 is formed with a plurality of lower electrode units 12 which are arranged in order. Each lower electrode unit 12 includes a clear transparent resistive film 12A, a bus electrode 12B, and others. A periphery of each lower electrode unit 12 is formed with a gluing frame 41, and a periphery of the substrate 1 is formed with a sealing frame 42. The material of the sealing frame 42 can be a light curable gluing, heat curable gluing, or petroleum wax.

A 0.4 mm thickness glass having an area corresponding to that of the substrate 1 is used as a panel layer 2. A lower surface of the panel layer 2 is formed with a plurality of upper electrode units 22 which are arranged corresponding to those of the lower electrode units 12 of the substrate 1. The upper electrode unit 22 also includes a clear transparent resistive film 22A, a bus electrode 22B, and others.

Then, the substrate 1 and the panel layer 2 are overlaid by aligning the targets 17, 27 on edges of the substrate 1 and the panel layer 2 respectively or by other precisely aligning method. By the gluing frames 41 and the sealing frame 42, the substrate 1 and the panel layer 2 are combined together as a combined plate. Therefore, each of the upper electrode units 22 and the corresponding lower electrode unit 12 are combined together by the gluing frame 41 so as to form as an independent touch sensing unit. Referring to the FIG. 3, the lower electrode unit 12 and the upper electrode unit 22 of the touch sensing unit are arranged oppositely with a gap formed by a plurality of projected spacers 13 between the transparent resistive films 12A and 22A. Moreover, by the sealing frame 42, the gap between the substrate 1 and the panel layer 2 is completely isolated from outside. Interiors of each sensing unit are protected by the seal of both the gluing frame 41 and the sealing frame 42, and are protected from being polluted in a following thinning process.

The following thinning process is performed by etching the combined plate through a solution of hydrofluoric acid with density about 10% to 30%. The outer surfaces of the glasses of the substrate 1 and the panel layer 2 are etched to be removed with a thickness of 0.2 mm so as to form a desired thickness of a finished touch panel. That is, the panel layer 2 is thinned as a glass with 0.2 mm thickness, and the substrate 1 is thinned as a glass with 0.5 mm thickness.

A next process is to attach at least one function film 6 to the surface of the panel layer 2 above each electrode unit, such as a polarizing film, a filter, or a border icon. Thus the touch panel will have functions of polarizing and filtering, and also the intensity of the panel layer 2 will be improved so as to prevent the thin glass from being cracked and broken.

Figure 2:
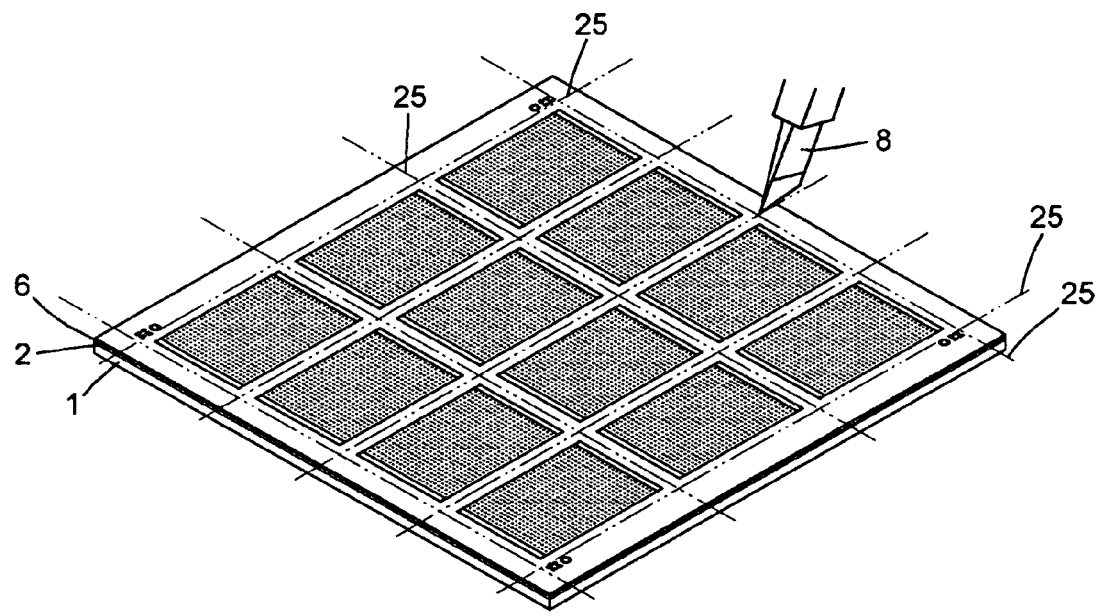
FIG. 2 is a schematic view of the combined plate of the panel layer and the substrate being cutting for a trench, showing a cutter is cutting along the predetermined cutting line on the combined plate.
Figure 3:
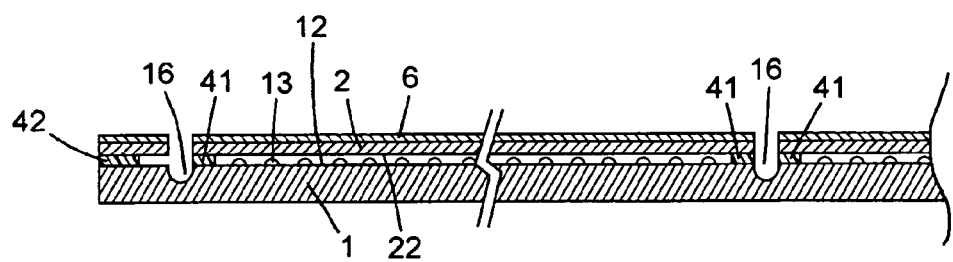
FIG. 3 is a cross section view of the combined plate after being cut as shown in FIG. 2.
Figure 4:
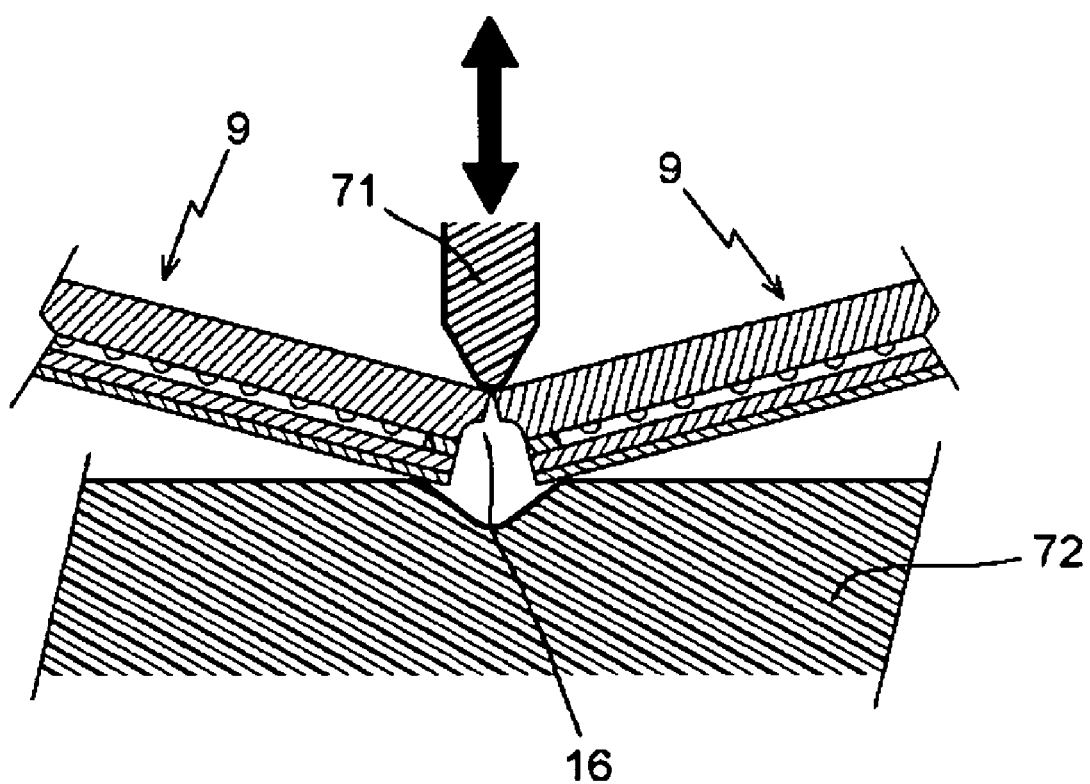
FIG. 4 is a schematic view of the separating process of the combined plate showing the status of the combined plate is pressed and separated along the predetermined cutting line.

A next process is a cutting process as shown in the FIG. 2. A cutter 8, such as a laser cutter or a diamond cutter, is used for cutting the panel layer 2 and the function films 6 from an upper side thereof along a predetermined cutting line 25. A trench 16 (as shown in FIG. 3) on the substrate 1 is formed by the cutter 8 after the panel layer 2 and the function films 6 are cut through so as to divide a desired area of the touch sensing unit. As shown in FIG. 4, a next process is a separating process. A pair of a mold head 71 with proper elastic deforming ability (like a rubber) and a mold plate 72 is aligned to the trench 16 on the substrate 1, and a proper pressing force is applied through the mold head 71 from the side of the substrate 1 to brake the glass substrate through the predetermined cutting line 25 so as to separate each finished touch panel 9.

Through the above description, the thicker substrate 1 and the thicker panel layer 2 used in the front manufacturing processes of the electrode unit arrangement, gluing frame attachment, and overlaying of two plates can prevent a crash and break because of a better intensity thereof. After the thinning process, one or more than one function film 6 attached to the panel layer 2 above each electrode unit can also improve the intensity of the panel layer 2 to prevent a crash and break. Therefore, the present invention of the touch panel with a glass panel layer and a glass substrate can produce one or more than one touch panel in one production cycle so as to improve production efficiency and also save time and labor power. Because of the better intensity of the thin glass of the panel layer 2 and the substrate 1 during the processes, a greater area touch panel can be manufactured without twisting and breaking the glass so as to substantially raise the quality and the yield of the touch panel product.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for manufacturing a touch panel, comprising the steps of:
    a) selecting a glass as a substrate; an upper surface of the substrate (1) being formed with a plurality of lower electrode units (12) which are arranged in order; each lower electrode unit (12) including a transparent resistive film (12A) and a bus electrode (12B); a periphery of each lower electrode unit (12) being formed with a gluing frame (41), and a periphery of the substrate (1) being formed with a sealing frame (42);
    selecting another glass having an area corresponding to that of the substrate (1) as a panel layer; a lower surface of the panel layer (2) being formed with a plurality of upper electrode units which are arranged corresponding to those of the lower electrode units (12) of the substrate (1); each upper electrode unit (22) also including a transparent resistive film (22A) and a bus electrode (22B);
    overlaying and aligning the substrate (1) with the panel layer (2) respectively by precisely aligning method; by the gluing frames (41) and the sealing frame (42), the substrate (1) and the panel layer (2) being combined together as a combined plate; therefore, each of the upper electrode units (22) and the corresponding lower electrode unit (12) being combined together by the gluing frame (41) so as to form as an independent touch sensing unit; the lower electrode unit (12) and the upper electrode unit (22) of the touch sensing unit being arranged oppositely with a gap formed by a plurality of projected spacers (13) between the transparent resistive films (12A and 22A); by the scaling frame (42), the gap between the substrate (1) and the panel layer (2) being completely isolated from outside;
    etching the combined plate through a solution of hydrofluoric acid; outer surfaces of the glasses of the substrate and the panel layer being etched to be removed with a predetermined thickness;
    attaching at least one function film (6) to the surface of the panel layer (2) above each electrode unit so that the touch panel will have functions of polarizing and filtering;
    using a cutter (8) to cut the panel layer (2) and the function films (6) from an upper side thereof along a predetermined cutting line (25); a trench (16) on the substrate (1) is formed by the cutter 8 after the panel layer (2) and the function films (6) are cut through so as to divide a desired area of the touch sensing unit; and
    aligning a pair of a mold head (71) and a mold plate (72) to the trench (16) on the substrate (1), and a pressing force being applied through the mold head (71) from the side of the substrate (1) to brake the glass substrate through the predetermined cutting line (25) so as to separate each finished touch panel 9.

2. The method for manufacturing a touch panel as claimed in claim 1, wherein the gluing frame and the sealing frame are formed only on the panel layer, or formed on the substrate and the panel layer.

3. The method for manufacturing a touch panel as claimed in claim 1, wherein a thickness of the panel layer is about 0.15 to 0.25 mm.

4. The method for manufacturing a touch panel as claimed in claim 1, wherein the combining plate is etched with a thickness of about 0.1 to 0.3 mm.

5. The method for manufacturing a touch panel as claimed in claim 1, wherein the material of the sealing frame is one of Petroleum wax, light curable gluing, and heat curable gluing.

6. The method for manufacturing a touch panel as claimed in claim 1, wherein a density of the solution of hydrofluoric acid is 10% to 30%.

7. The method for manufacturing a touch panel as claimed in claim 1, wherein at least one function film is attached to the panel layer above position of each electrode unit alter the process of etching and before the process of cutting.

8. The method for manufacturing a touch panel as claimed in claim 7, wherein the function film is one or a combination of a polarizing film, filter and border icon.

9. The method for manufacturing a touch panel as claimed in claim 7, wherein overlaying of the substrate (1) with the panel layer (2) is performed by aligning the targets (17, 27) on edges of the substrate (1) and the panel layer (2) respectively or by other precisely aligning method.

* * * * *